United States Patent
Caine et al.

(10) Patent No.: US 10,026,515 B2
(45) Date of Patent: Jul. 17, 2018

(54) GENERATING ISOTOPES IN AN IRRADIATION TARGET HOLDER INSTALLED IN A NUCLEAR REACTOR STARTUP SOURCE HOLDER POSITION

(71) Applicant: GE-Hitachi Nuclear Energy Americas LLC, Wilmington, NC (US)

(72) Inventors: Thomas A. Caine, Sunol, CA (US); Russell E. Stachowski, Wilmington, NC (US); Dana C. Miranda, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 713 days.

(21) Appl. No.: 14/705,190

(22) Filed: May 6, 2015

(65) Prior Publication Data
US 2017/0062085 A1    Mar. 2, 2017

(51) Int. Cl.
*G21G 1/02* (2006.01)
*G21C 3/32* (2006.01)
*G21C 23/00* (2006.01)

(52) U.S. Cl.
CPC .............. *G21G 1/02* (2013.01); *G21C 3/32* (2013.01); *G21C 23/00* (2013.01)

(58) Field of Classification Search
CPC ............. G21G 1/02; G21C 23/00; G21C 3/32
USPC ................ 376/158, 202, 214, 340, 342, 343
See application file for complete search history.

(56) References Cited

U.S. PATENT DOCUMENTS

| | | | | |
|---|---|---|---|---|
| 3,031,394 A | * | 4/1962 | McCorkle | G21C 1/30 376/202 |
| 4,196,047 A | * | 4/1980 | Mitchem | G21C 1/303 376/202 |
| 4,208,247 A | * | 6/1980 | Impink | G21C 7/117 376/156 |
| 2004/0105520 A1 | * | 6/2004 | Carter | G21G 1/02 376/268 |

(Continued)

OTHER PUBLICATIONS

European Search Report and Written Opinion issued in connection with corresponding EP Application No. 16168194.5 dated Sep. 20, 2016.

(Continued)

*Primary Examiner* — Jack W Keith
*Assistant Examiner* — Daniel Wasil
(74) *Attorney, Agent, or Firm* — Ryan Alley IP (57) ABSTRACT

A nuclear reactor is operated with irradiation target holders fit in open locations inside of an operating commercial nuclear core and placed with ends at vertical bottom and top of the core or any position therebetween to directly expose holders to nuclear fuel reactions. Holders have ends and overall shape that are joined with existing reactor structures, while fitting closely with fuel and moderator and being easily removable from the same. Holders are fabricated of any reactor-compatible material that will retain irradiation targets and daughter products. Holders securely retain irradiation targets and daughter products of any shape or phase throughout reactor operation. Holders can be installed during reactor outages and irradiated during operation without risk of movement or interference with operation. After a desired period of operation and irradiation, holders can be harvested from the core independent of other core structures and fuel.

11 Claims, 6 Drawing Sheets

(56) References Cited

U.S. PATENT DOCUMENTS

| | | |
|---|---|---|
| 2009/0122946 A1 | 5/2009 | Fawcett et al. |
| 2009/0135983 A1 | 5/2009 | Russell, II et al. |
| 2009/0274260 A1 | 11/2009 | Russell, II et al. |
| 2011/0051874 A1 | 3/2011 | Allen et al. |
| 2011/0206175 A1 | 8/2011 | Smith et al. |
| 2011/0216868 A1 | 9/2011 | Russell, II et al. |
| 2012/0087454 A1 | 4/2012 | Stucker |
| 2016/0012928 A1* | 1/2016 | Guler .................. G21G 1/02 376/156 |

OTHER PUBLICATIONS

GE, "Chapter 5.1 Source Range Monitor System," General Electric Systems Technology Manual, Dec. 14, 2014.

\* cited by examiner

GENERATING ISOTOPES IN AN IRRADIATION TARGET HOLDER INSTALLED IN A NUCLEAR REACTOR STARTUP SOURCE HOLDER POSITION

BACKGROUND

Figure 1:
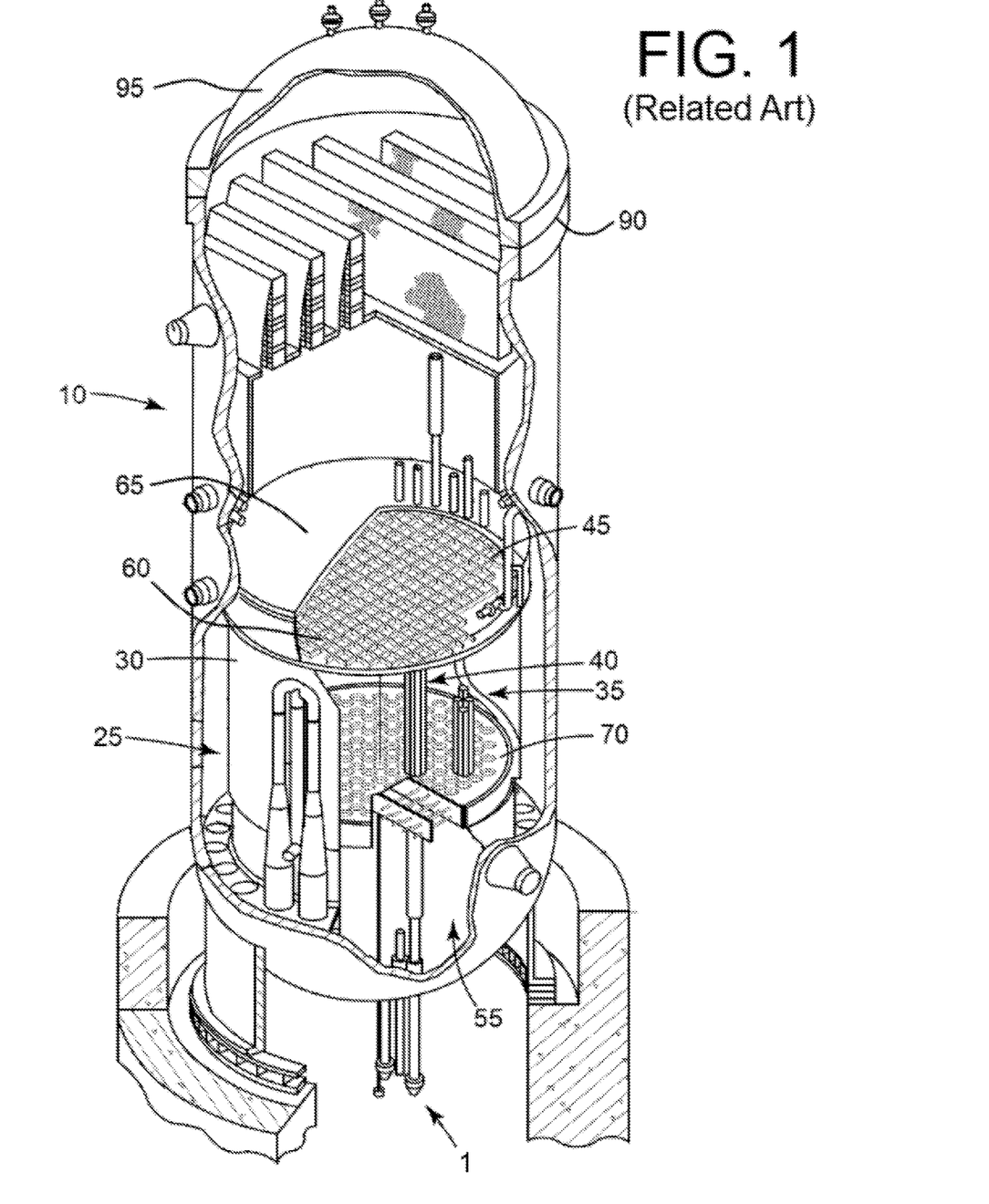
FIG. 1 is an illustration of a related art nuclear power vessel and internals.

As shown in FIG. 1, a nuclear power station conventionally includes a reactor pressure vessel 10 with various configurations of fuel and reactor internals for producing nuclear power. For example, vessel 10 may include a core shroud 30 surrounding a nuclear fuel core 35 that houses fuel structures, such as fuel assemblies 40. Core 35 may be bounded vertically by top guide 45 and core plate 70. Fuel assemblies 40 may extend between and seat into core plate 70 and top guide 45, which may include several openings shaped to receive ends of assemblies 40. Other core structures, such as control elements and instrumentation tubes, may likewise extend through and/or between core plate 70 and/or top guide 45. One or more control rod drives 1 may be positioned below vessel 10 and connect to control rod blades or other control elements that extend among fuel assemblies 40 within core 35.

An annular downcomer region 25 may be formed between core shroud 30 and vessel 10, through which fluid coolant and moderator flows into the core lower plenum 55. For example, in US Light Water Reactor types, the fluid may be purified water, while in natural uranium type reactors, the fluid may be purified heavy water. In gas-cooled reactors, the fluid coolant may be a gas such as helium, with moderation provided by other structures. The fluid may flow upward from core lower plenum 55 through core 35. In a boiling water-based reactor, a mixture of water and steam exits nuclear fuel core 35 and enters core upper plenum 60 under shroud head 65.

Nuclear reactors are refueled periodically with new fuel to support power operations throughout an operating cycle. During shutdown for refueling, the vessel 10 is cooled, depressurized, and opened by removing upper head 95 at flange 90. With access to the reactor internals, equipment may be shifted or removed and some or all of fuel bundle assemblies 40 may be replaced and/or moved within core 35. Maintenance on other internal and external structures may be performed during such an outage.

Figure 2A:
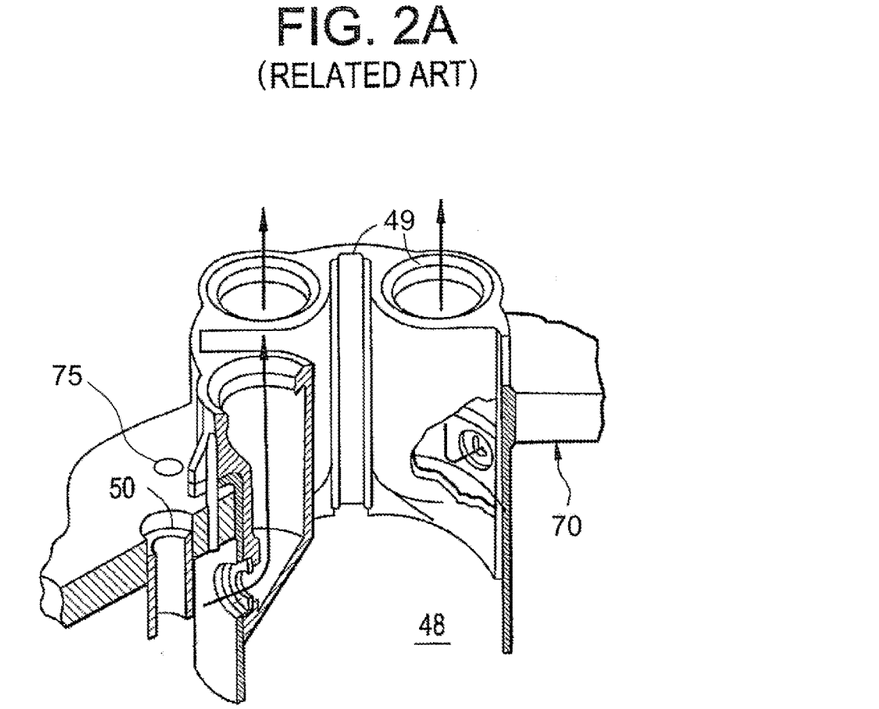
FIGS. 2A and 2B are illustrations of a related art core plate and fuel support casting.
Figure 2B:
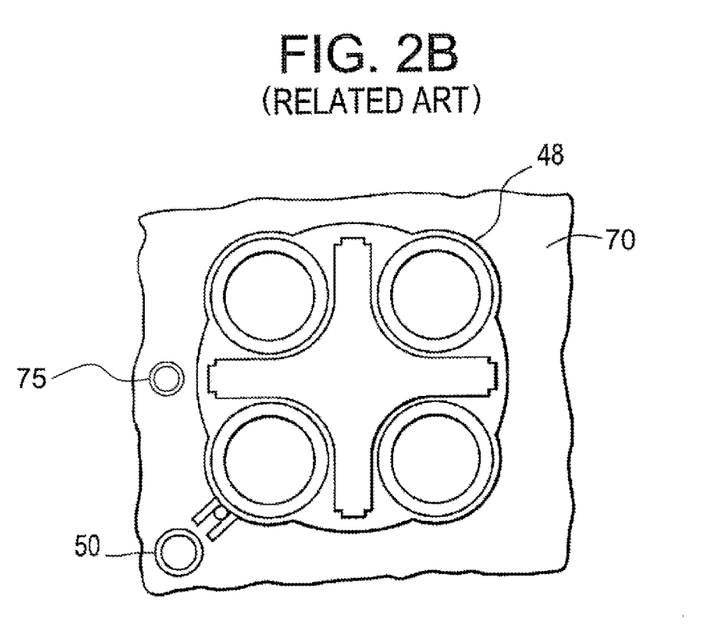

As shown in FIGS. 2A and 2B, one or more fuel support castings 48 may sit on and/or extend through core plate 70. Casting 48 may include several orifices 49 to receive fuel assemblies and/or control elements, aligning them with respect to one another and with core plate 70 and directing coolant up through such components. Casting 48 may accommodate several fuel assemblies in various orifices 49 while maintaining other space on core plate 70. For example, an instrumentation tube 50 may penetrate core plate 70 and be positioned next to casting 48, allowing tube 50 to extend vertically adjacent to several fuel assemblies positioned in casting 48.

Similarly, one or more source holder penetrations 75 may extend into core plate 70 adjacent to casting 48. Source holder penetration 75 may hold a startup source, such as a sealed Californium or Plutonium-Beryllium isotope that emits substantial and detectable neutron spectra, which reliably begins the nuclear chain reaction in a new core with completely fresh fuel, or after excessively long shut-down periods when spontaneous fission is unreliable in burnt fuel. Co-owned "General Electric Systems Technology Manual," Dec. 14, 2014, Chapter 5.1, describes helpful technological context and is incorporated by reference herein in its entirety. As seen in the top-down view of FIG. 2B, source holder penetration 75 may position the source in a desired static relation with instrumentation tube 50, permitting detection of neutrons from a source in penetration 75 to compare to neutrons generated through fission during startup, and fuel assemblies in casting 48. In this way, core plate 70 and casting 48 may radially/horizontally align several different core components at a base of a core and ensure they maintain desired positioning throughout an axial/vertical extent of the core.

SUMMARY

Example embodiments include holders for materials that are to be subject to irradiation in free core positions while sealed in a nuclear reactor core. Example embodiments can include lower and/or upper ends that mate with or otherwise join to reactor components to position holders within the core, in close proximity to neutron-generating fuel and moderator. Holders may robustly seal in irradiation targets and daughter products produced through irradiation with neutron flux, such as in internal cavities of any shape or size that houses desired targets. As an example, a holder may be shaped to minimally join with an existing core plate and/or fuel castings at a bottom of the core and span up to a top guide opening at a top of the core, resulting such an example holder being secured in, but easily removable from, the core at either end, while positioning the holder in an otherwise open space in the core. Such a space may be vacated by an unused startup source holder, for example. Irradiation targets may absorb neutron flux encountered at a position within the holder.

Example methods include installing and irradiating target holders in operating nuclear reactors. Holders can be placed directly within a fuel core in example methods, without any structure between the holders and fuel and/or moderator, for higher irradiation by radiation encountered in the core during operation. For example, holders can be placed in positions vacated by conventional core components, and holders may be specifically shaped and dimensioned to be compatible with such positions. During operation, the installed holder may remain stationary within the core and generate larger amounts of desired daughter products through absorption and potentially radioactive decay without significantly contributing to reactivity where installed. Following an operational cycle of several months or other period of operation, the holders can be retrieved from the nuclear core without involvement with fuel or other core structures, yet holders may remain shielded in a moderator during such operations, allowing safer and easier handling and harvesting.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that most methods for generating materials through neutron capture in a nuclear reactor insert irradiation targets into fuel or instrumentation tubes, or form irradiation targets as existing core structures like control blades. Applicants have recognized that these methods tend to tie generation to reactor operations, requiring the targets to be moved and harvested with fuel, or require complex configurations to interact with instrumentation tubes or existing core structures. Applicants have further newly identified that startup holder positions in most nuclear reactors have a distinct functionality that is no longer needed following operation of the reactor. To overcome these newly-recognized problems as well as others, the inventors have developed methods and systems that independently place irradiation targets directly into a nuclear fuel core without impacting fuel or other core structures or operation. These methods and systems may provide new functionality to startup holder positions and other core locations available during operation.

The present invention is irradiation target holders for use in a nuclear reactor and methods of using the same. In contrast to the present invention, the few example embodiments and example methods discussed below illustrate just a subset of the variety of different configurations that can be used as and/or in connection with the present invention.

Figure 3:
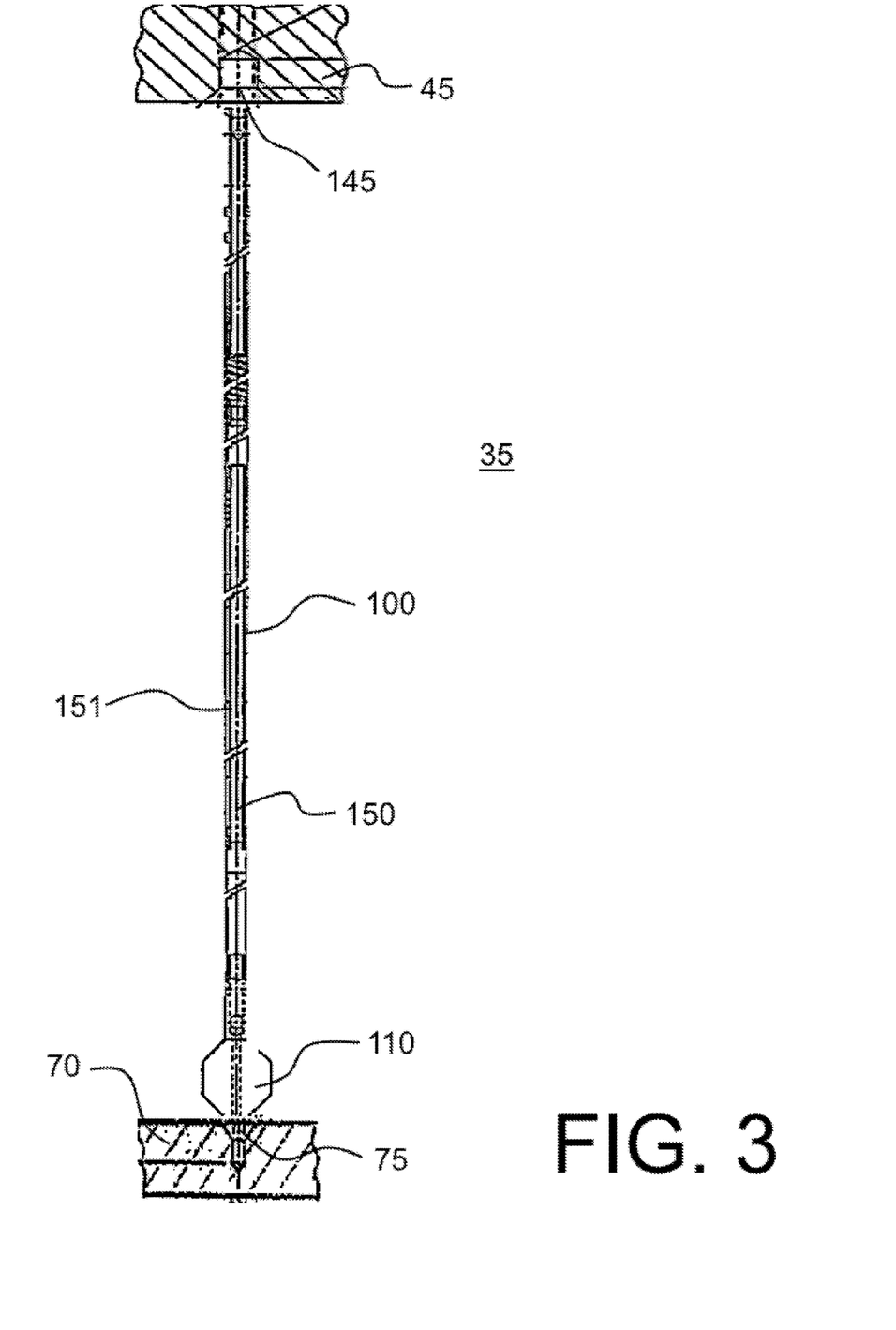
FIG. 3 is an illustration of an example embodiment incore irradiation target holder installed in a nuclear reactor core.

FIG. 3 is an illustration of an example embodiment incore irradiation target holder 100. As shown in FIG. 3, holder 100 may span core 35 in a vertical or axial dimension between core plate 70 and top guide 45, irrespective of other core internals. For example, holder 100 may be shaped and sized to fit among several fuel assemblies, instrumentation tubes, control elements, etc. typically found in a nuclear core. Although example embodiment holder 100 is shown spanning an entire vertical distance from core plate 75 to top guide 45, it is understood that partial extension is possible with proper connections.

As shown in FIG. 3, example embodiment incore irradiation target holder 100 is configured to insert into—to securely mate with—a source holder penetration 75 in core plate 70. For example, source holder penetration 75 may be an existing hole or other aperture in core plate 75 into which a startup source holder is originally placed and later removed by the plant operator or other servicer; or for example, source holder penetration 75 may be a penetration never used for any purpose or made ad hoc during an outage or other period of access to core 35. Source holder penetration 75 may be one or more inches deep with an approximate one-inch diameter and may extend entirely or partially through core plate 70. Source holder penetration 75 may be placed in other structures besides a core plate 70; however, placement of source holder penetration 75 provides vertical clearance above penetration 75 that is not blocked by other core internals such as fuel assemblies, fuel castings, instrumentation, flow devices, etc. common to nuclear cores.

Example embodiment holder 100 may seat into penetration 75 through gravity, operator insertion, and/or under the force of a spring or other retention lock or mechanism during both installation and operation. For example, holder 100 may screw into penetration 75, lock into the same through a tang-and-mating, or simply sit through gravity in penetration 75. As such, an axially lower end of example embodiment holder 100 may be specifically shaped, sized, or otherwise configured to match a desired penetration 75 for insertion.

As shown in FIG. 3, if example embodiment holder 100 runs a vertical length of core 35 holder 100 may seat into a top hole 145 in top guide 45. For example, in a boiling water reactor, core 35 may be approximately 13 feet or longer, and holder 100 may extend all or any of this distance. Top hole 145 may be similar to source holder penetration 75 in that it may be preexisting or newly formed. Top hole 145 may be aligned and pre-purposed for retaining a startup source holder in conjunction with penetration 75 in core plate 70. Example embodiment holder 100 may seat into top hole 145 through operator insertion. As such, an axially higher end of example embodiment holder 100 may be specifically shaped, sized, or otherwise configured to match a desired top hole 145 for insertion and retention.

Holder 100 may be under the force of a spring or bias or other locking mechanism provided during installation and/or operation. For example, holder 100 may seat into top hole 145 due to a spring in penetration 75 biasing example embodiment holder 100 upward vertically into hole 145. A spring in top hole 145 may similarly bias example embodiment holder 100 downward axially into opposite penetration 75, permitting a desired degree of axial securing.

Figure 4:
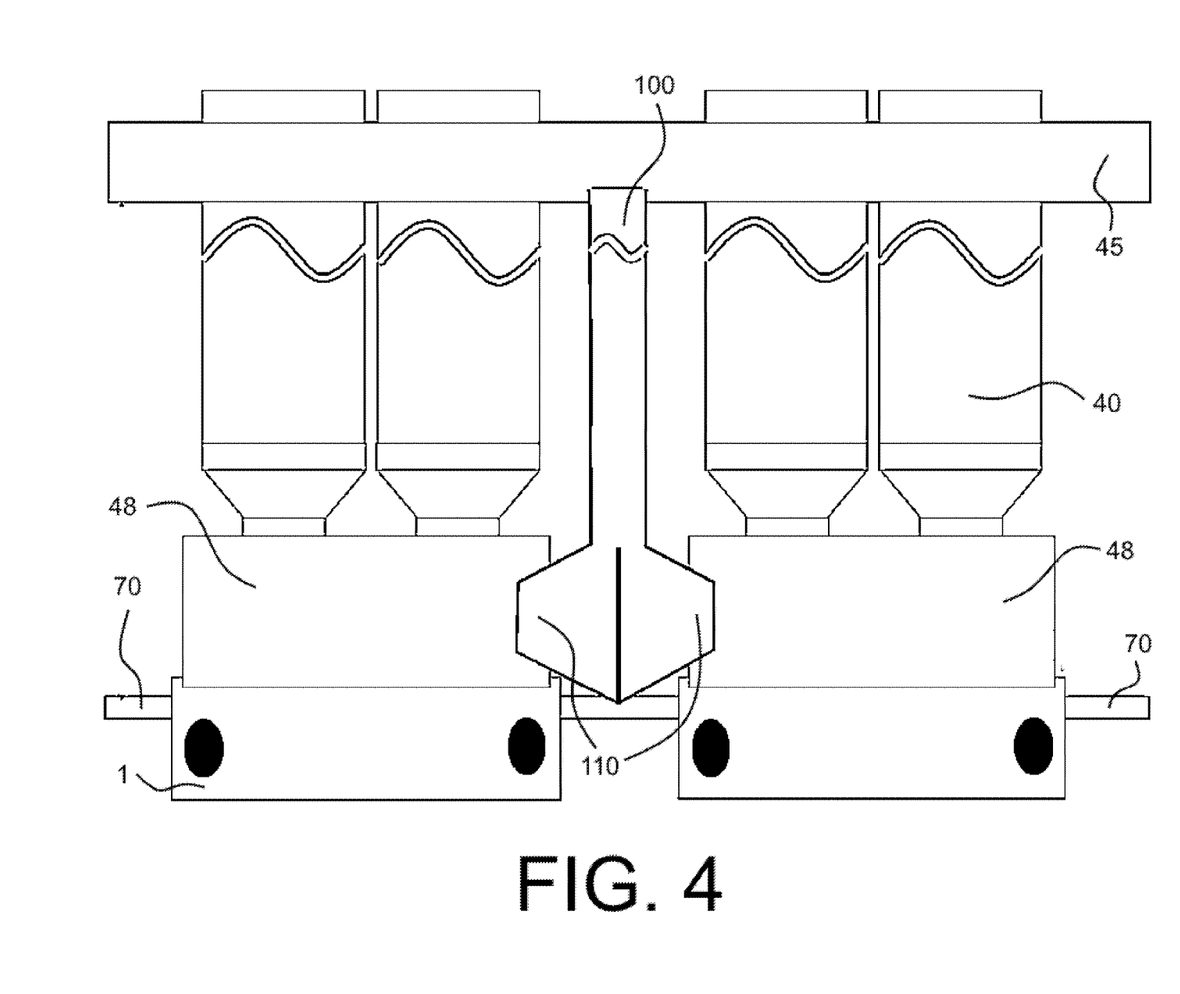
FIG. 4 is a detail illustration of an example embodiment incore irradiation target holder installed between fuel castings.

Example embodiment incore irradiation target holder 100 may further include one or more casting fins 110 that extend radially—horizontally—or otherwise with respect to core 35 to mate with fuel castings nearby. As shown in FIG. 4, a simplified detail of a base of example embodiment holder 100, fins 110 may be captured by a side of fuel casting 48. For example, fuel casting 48 may include a slot configured to receive a part of a startup source holder or other core component, and fin 110 may be shaped and sized to fit within such a slot. Holder 100 may include, for example, four perpendicular fins 110 that insert into up to four adjacent castings 48. Example embodiment holder 100 may thus seat between and into several adjacent casting 48 that anchors one or more fuel assemblies 40, such that holder 100 is positioned adjacent to assemblies 40 extending upward in a vertical or axial direction.

While penetration 75 and hole 145 may provide axial securing to holder 100 shaped to seat therein, fins 110 shaped to seat into an adjacent casting 45 may provide rotational securing and/or prevent radial translation of holder 100. Fins 110 may lock into or removably seat in casting(s) 48 at other angles and positions in order to orient holder 100 at other positions and/or mate with other structures entirely to take advantage of other existing spaces and securing penetrations within a nuclear core. Similarly, example embodiment holder 100 may include any or neither of fins 110 and an end seating into penetration 75 (FIG. 3) to achieve a desired positioning and level of securing within a nuclear core.

Through the above-described example features, an example embodiment holder 100 may include any number of retaining features that are very similar to existing structures in startup holders that mate with other core features like a core plate and top guide, in order to replace the same without modification and/or disruption of existing core features. An operator or other servicer may install example embodiment holder 100 during an outage or other access period in combination with such existing core features. For example, a reactor may be operated for a period of months or years to sustain a nuclear chain reaction that generates heat that is in turn converted to electricity. The reactor may then be shut down by terminating the nuclear chain reaction, and operators can access the reactor internals for maintenance and refueling. During such an outage, reactor internals, one or more fuel assemblies 40, and potentially any unnecessary startup source may be removed and/or shuffled within the core, and fresh fuel may be added. In the same timeframe, example embodiment holder 100 may be installed where the startup source was or would have been within the nuclear core. The reactor may then be brought back to operation to sustain the nuclear chain reaction and irradiation inherent therein, and example embodiment holder 100 may remain in the installed position during such operation and irradiation and retrieved at a later time, such as during a subsequent outage.

As shown in FIG. 3, example embodiment holder 100 may include an internal cavity 150 that houses one or more irradiation targets 151 that convert to a desired daughter product when exposed to radiation in an operating nuclear reactor. For example, internal cavity 150 may be an integrally-formed housing within holder 100 into which an irradiation target 151 may be inserted at fabrication and removed through destruction of holder 100. Similarly, internal cavity 150 may be selectively opened and/or segmented to allow segregation of multiple desired targets at differing positions and nondestructive removal. Compatible designs of fuel rod bodies and irradiation target holders are shown in co-owned patent publications 2009/0122946 published May 14, 2009 to Fawcett et al.; 2009/0135983 published May 28, 2009 to Russell, II et al.; and 2009/0274260 published Nov. 5, 2009 to Russell, II et al., which are useable as central portions of example embodiment holder 100, these publications being incorporated herein in their entireties.

Example embodiment incore irradiation target holder 100 may otherwise be fabricated of materials that substantially maintain their physical properties in an operating nuclear reactor environment so as to preserve positioning and containment of irradiation targets 151 retained in internal cavity 150. For example, holder 100 may be fabricated of stainless steel, a zirconium alloy, and aluminum alloy, etc. If fuel casting 48, core plate 70 and/or tope guide 45 are fabricated of one material, such as stainless steel, example embodiment holder, at least in structures that directly contact these core structures, may be another material, such as zirconium alloys, in order to enhance material compatibility and eliminate voltaic potential and fouling. Such materials may further have minimal impact on radiation, having minimal scattering and absorption cross-sections for neutron flux encountered in a reactor.

Example embodiment holder 100 may match geometries of startup source holders at vertical ends, so as to mate with existing core structures that retain such startup holders; however, the remainder of holder 100 may be any shape that maximizes desired daughter material production in core 35. For example, as shown in the cross-section of FIG. 5A, internal cavity 150 may be round, or as shown in FIG. 5B, cruciform. Internal cavity 150 may similarly be helical, square, planar, etc. and extending in any degree in a horizontal position in order to accommodate irradiation targets 151 of a matching shape and/or maximize radiation exposure at desired positions within a nuclear fuel core. Internal cavity 150 may further include a moderator and/or coolant such as a liquid water reservoir 152 shown in FIG. 5A or other structure that enhances geometry, irradiation, and/or cooling of any irradiation targets 151 contained in example embodiment holder 100.

Figure 5A:
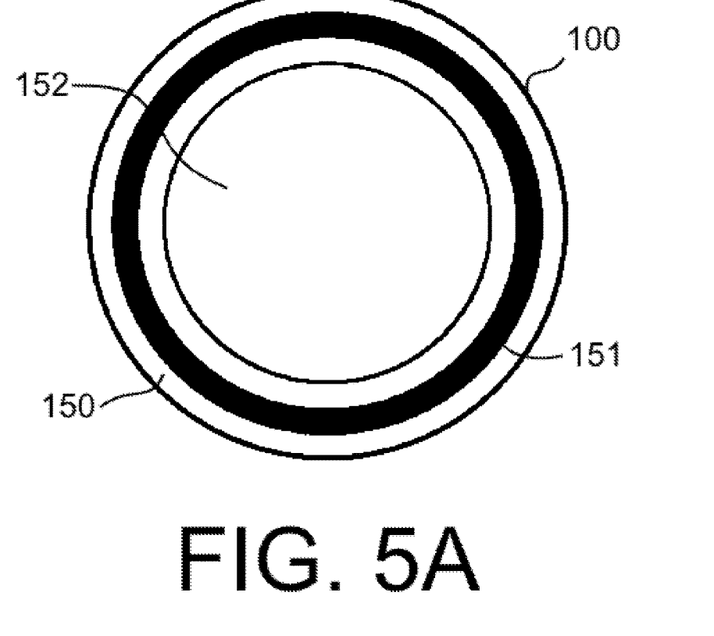
FIGS. 5A and 5B are illustrations of cross sections of example embodiment incore irradiation target holders.
Figure 5B:
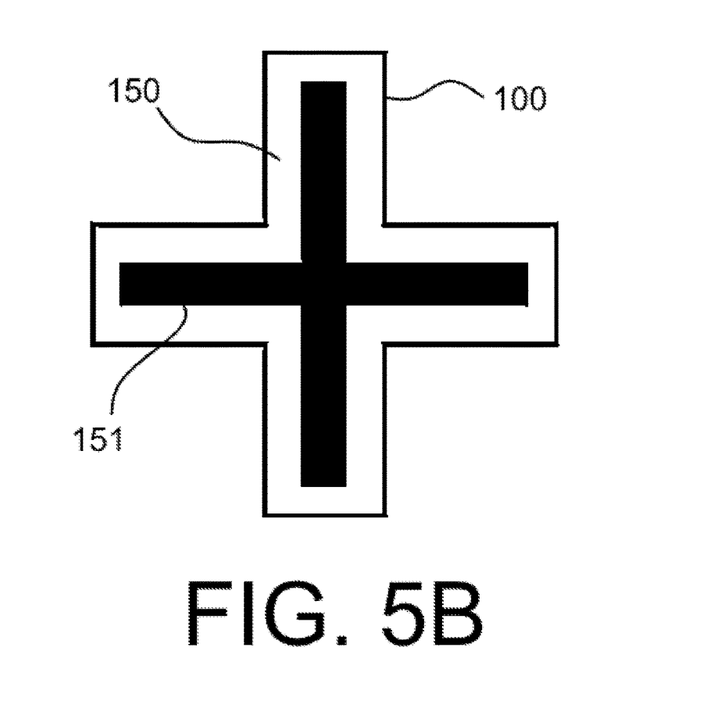

Example embodiment holder 100 may be relatively small, such as cylindrical as shown in radial cross-section in FIG. 5A and approximately half to a full inch in diameter. If holder 100 is up to 13 feet in axial length and spans an entire vertical length of core 35, internal cavity 150 may be approximately 8 feet in axial length to match lengths of fueled sections of the core. Even this smaller example sizing may accommodate, for example, 250 cubic centimeters of irradiation targets. Or for example, as shown in radial cross-section in FIG. 5B, with a larger cruciform cavity 150, 1-2 inches in total arm length, 570 cubic centimeters of irradiation targets may be accommodated. Depending on the parent irradiation target, these sizes may enable several thousands of curies of activity for a produced radioisotope or several moles of atoms of a produced isotope from a parent material and sufficient irradiation.

As shown in FIG. 3, source holder penetration 75 and/or top hole 145 may be intentionally positioned within core 35 to receive a startup source holder, and thus either or both penetration 75 and top hole 145 may be free post-startup or in the event such startup sources are not used at startup. Penetration 75 and top hole 145 may further provide an open passage between the two for accommodating a startup source holder, providing close proximity to fuel elements or fuel assemblies 40 (FIG. 4) generating large amounts of neutron flux during operation. This open passage may typically be readily accessible with fuel out during refueling outages every 2-3 years, and this passage may typically be underwater or otherwise shielded with fuel.

Based on the above characteristics of existing source holder penetrations 75 and/or top holes 145, example embodiment incore irradiation target holder 100 may take advantage of vacated passages between holder penetration 75 and top hole 145 following startup to generate desired daughter products from irradiation targets, including industrially-valuable elements and radioisotopes. Particularly, in the case of parent material Cobalt-59, significant irradiation with thermal neutrons for an operating cycle in holder 100 placed between bundles in a typical startup holder position within a nuclear core will generate large amounts of Cobalt-60, which is medically useful for its high-energy gamma rays. Of course, other irradiation targets, like iridium-193 or any other non-fissionable isotope with an atomic number under 90 and an appreciable thermal neutron absorption cross-section, such as a cross-section exceeding one barn, are useable as irradiation targets in example embodiments.

Accessing such a holder 100 may be relatively simple during fuel movements in an operational outage, when source holder locations can be readily exposed through fuel moves. Advantageously, holder 100 may be entirely separate from any fuel in the core and shielded from operators during such accessing by a moderator such as coolant light water or other shield. This permits easy and safe handling of example embodiment holder 100 in a fuel core without involvement with nuclear fuel.

Figure 6:
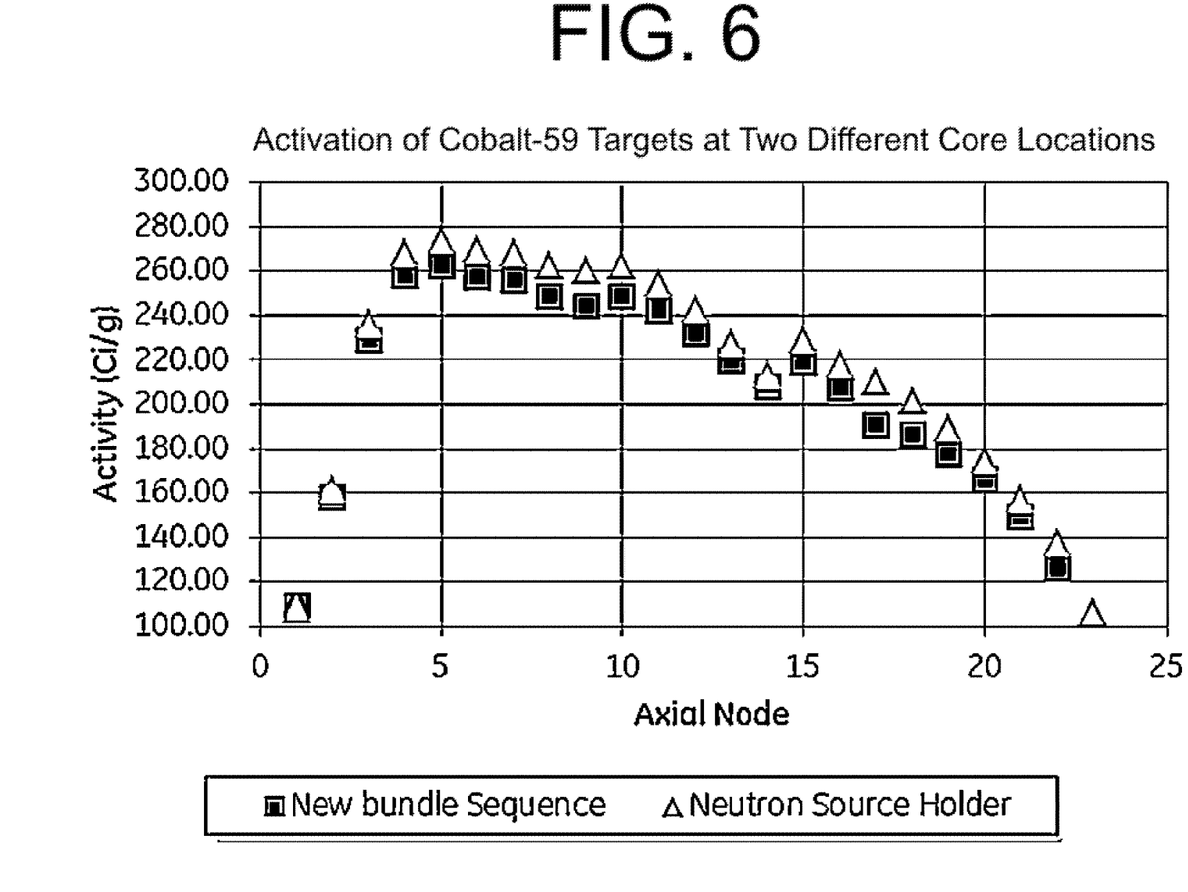
FIG. 6 is a graph demonstrating higher activation in example embodiment incore irradiation target holders.

FIG. 6 is a graph showing improved yields from use of example embodiment holder 100 at existing source holder penetrations 75 and/or top holes 145 between fuel assemblies compared to an expected best-yield at a corner fuel rod in a fuel assembly. FIG. 6 reports activation levels in Curies per gram of irradiation target versus axial level for two different positions within a same simulated core with all other variables constant. As shown in FIG. 6, over the same amount of time in the same core, the example embodiment holder containing a same mass of Cobalt-59 irradiation targets will achieve higher activation—a higher percentage of nuclides converted to Cobalt-60—when positioned between fuel assemblies at a source holder location as compared to a corner rod position in a fresh fuel bundle. This improvement is seen at every axial position, due to improved moderator and neutron flux access at the source holder positions with which example embodiments are compatible.

Example embodiments and methods thus being described, it will be appreciated by one skilled in the art that example embodiments may be varied and substituted through routine experimentation while still falling within the scope of the following claims. For example, a variety of different available source holder locations, in several different types of reactor designs, are compatible with example embodiments and methods simply through proper dimensioning of example embodiments—and fall within the scope of the claims. Such variations are not to be regarded as departure from the scope of these claims.

What is claimed is:

1. A method of creating desired isotopes in a commercial nuclear reactor generating heat for use in power production, the method comprising:
    operating the nuclear reactor to generate heat for use in power production,
        wherein the reactor includes an irradiation target holder in a core of the nuclear reactor, and the irradiation target holder being inaccessible from outside the reactor during the operating, wherein,
        the irradiation target holder directly contacts and is moveable within moderator of the nuclear reactor,
        the irradiation target holder is directly exposed to neutron flux from a plurality of fuel assemblies surrounding the irradiation target holder in the core during the operating,
        wherein the irradiation target holder is physically separate from all of the plurality of fuel assemblies,
        the irradiation target holder impermeably contains an irradiation target having a thermal neutron absorption cross section exceeding 1 barn and an atomic number less than 90, and
        the operating irradiates the irradiation target holder with the neutron flux to produce a desired daughter product from the irradiation target.

2. The method of claim 1, further comprising:
    removing a startup source holder from the core; and
    installing the irradiation target holder in the core where the startup source holder was removed, wherein the removing and installing are performed during a non-operational period.

3. The method of claim 2, further comprising:
    retrieving the irradiation target holder from the core, wherein the retrieving is performed during a non-operational period.

4. The method of claim 3, wherein the retrieving includes moving at least one of the plurality of fuel assemblies directly adjacent to the irradiation target holder so as to expose and access the irradiation target holder.

5. The method of claim 2, wherein the removing withdraws at least a portion of the startup source holder from a penetration in a core plate supporting the plurality of fuel assemblies.

6. The method of claim 5,
    wherein the installing includes inserting at least a portion of the irradiation target holder into the penetration in the core plate previously occupied by the startup source holder and seating a fin of the irradiation target holder into an adjacent fuel casting on the core plate.

7. The method of claim 1, wherein the irradiation target is at least 0.1 kilograms of cobalt-59.

8. The method of claim 1, wherein the operating is performed for a plurality of months, and wherein the irradiation target holder is sealed inside the reactor during the operating, and wherein the irradiation target does not produce neutrons during the operating.

9. A method of creating desired isotopes in a commercial nuclear reactor generating heat for use in power production, the method comprising:
removing a startup source holder from a startup holder position in a core of the nuclear reactor;
installing an irradiation target holder in the startup holder position by inserting at least a portion of the irradiation target holder into a penetration in a core plate at a bottom of the core previously occupied by the startup source holder and seating a fin of the irradiation target holder into an adjacent fuel casting on the core plate;
operating the nuclear reactor to generate heat for use in power production,
wherein the reactor includes the irradiation target holder in the core of the nuclear reactor in the startup holder position directly exposed to neutron flux from a plurality of nuclear fuel assemblies surrounding the irradiation target holder and moderator in the core, and the irradiation target holder being inaccessible from outside the reactor during the operating, wherein,
the irradiation target holder is physically separate from all the plurality of fuel assemblies and impermeably contains an irradiation target having a thermal neutron absorption cross section exceeding 1 barn and an atomic number less than 90, and
the operating irradiates the irradiation target holder with neutron flux to produce a desired daughter product from the irradiation target.

10. The method of claim 9, wherein the irradiation target is at least 0.1 kilograms of cobalt-59.

11. The method of claim 9, wherein the operating is performed for a plurality of months, and wherein the irradiation target holder is sealed inside the reactor during the operating, and wherein the irradiation target does not produce neutrons during the operating.

\* \* \* \* \*